(12) United States Patent
Khanzode et al.

(10) Patent No.: US 9,477,790 B2
(45) Date of Patent: Oct. 25, 2016

(54) AUTOMATED MEP DESIGN (71) Applicants: Atul Khanzode, Sunnyvale, CA (US); Saurabh Tiwari, Maharashtra (IN); Christopher Rippingham, San Francisco, CA (US)

(72) Inventors: Atul Khanzode, Sunnyvale, CA (US); Saurabh Tiwari, Maharashtra (IN); Christopher Rippingham, San Francisco, CA (US)

(73) Assignee: DPR CORPORATION, Redwood City, CA (US)

( * ) Notice: Subject to any disclaimer, the term of this patent is extended or adjusted under 35 U.S.C. 154(b) by 322 days.

(21) Appl. No.: 14/143,548

(22) Filed: Dec. 30, 2013

(65) Prior Publication Data
US 2015/0186558 A1   Jul. 2, 2015

(51) Int. Cl.
*G06F 17/50* (2006.01)

(52) U.S. Cl.
CPC .................. *G06F 17/5004* (2013.01)

(58) Field of Classification Search
USPC ................................. 703/1, 2, 18, 7
See application file for complete search history.

(56) References Cited

U.S. PATENT DOCUMENTS

| | | | | |
|---|---|---|---|---|
| 5,189,606 A | * | 2/1993 | Burns | G06Q 10/06 705/7.12 |
| 9,009,011 B2 | * | 4/2015 | Vanker | G06F 17/5004 703/1 |
| 2008/0062167 A1 | * | 3/2008 | Boggs | G06F 17/5004 345/419 |
| 2010/0199257 A1 | * | 8/2010 | Biggerstaff | G06F 8/76 717/104 |
| 2013/0211795 A1 | * | 8/2013 | Vanker | G06F 17/5004 703/1 |

* cited by examiner

Primary Examiner — Thai Phan
(74) Attorney, Agent, or Firm — Kilpatrick Townsend & Stockton LLP (57) ABSTRACT

Embodiments of the present invention include a method for automatically designing MEP for a building. The method may include receiving information about the building including a first structural model of the building, and retrieving design specifications from a database, including information about local building codes, physical laws and building design rules. Information about available MEP components may be retrieved from a component library. The information about the building and the design specifications may be analyzed to determine additional elements for the first structural model of the building. A second structural model of the building including the additional elements may then be prepared.

20 Claims, 9 Drawing Sheets

| Systems | Medium Pressure Supply | Low Pressure Supply | Exhaust Duct | Flex Duct | VAV Boxes and HeatCraft | Fire Sprinkler piping | Hydronic Piping | DCW Piping | DHW Piping | Med Gas Piping | Waste Piping | Vent Piping | Rain Wate Leaders | Conduits | Hangers | J Hooks | Misc Metals | Wall Bracing | King Studs for Drywall | Struct Steel | Seismic Bracing | Pneumatic tube | Hangers | Access Zones |
|---|---|---|---|---|---|---|---|---|---|---|---|---|---|---|---|---|---|---|---|---|---|---|---|---|
| Medium Pressure Supply | X | | | | | | | | | | | | | | | | | | | | | | | |
| Low Pressure Supply | | | | | | | | | | | | | | | | | | | | | | | | |
| Exhaust Duct | | | | | | | | | | | | | | | | | | | | | | | | |
| Flex Duct | | | | | | | | | | | | | | | | | | | | | | | | |
| VAV boxes and HeatCraft | | | | | | | | | | | | | | | | | | | | | | | | |
| Fire Sprinkler piping | 1 | 1 | 1 | 1 | 1 | X | | | | | | | | | | | | | | | | | | |
| Hydronic piping (CHWR) | 1 | 1 | 1 | 1 | 1 | 1 | X | | | | | | | | | | | | | | | | | |
| DCW Piping | 1 | 1 | 1 | 1 | 1 | 1 | 1 | X | | | | | | | | | | | | | | | | |
| DHW Piping | 1 | 1 | 1 | 1 | 1 | 1 | 1 | 1 | X | | | | | | | | | | | | | | | |
| Med Gas Piping | 2 | 2 | 2 | 2 | 2 | 2 | 2 | 2 | 2 | X | | | | | | | | | | | | | | |
| Waste Piping (SS) | 1 | 1 | 1 | 1 | 1 | 1 | 1 | 1 | 1 | 1 | X | | | | | | | | | | | | | |
| Vent Piping (Vent) | 1 | 1 | 1 | 1 | 1 | 1 | 1 | 1 | 1 | 1 | 1 | X | | | | | | | | | | | | |
| Rain Water Leaders | 1 | 1 | 1 | 1 | 1 | 1 | 1 | 1 | 1 | 1 | 1 | 1 | X | | | | | | | | | | | |
| Conduits | 0 | 0 | 0 | 0 | 0 | 1 | 1 | 1 | 1 | 2 | 1 | 1 | 1 | X | | | | | | | | | | |
| Hangers | 2 | 2 | 2 | 2 | 2 | 2 | 2 | 2 | 2 | 2 | 1 | 1 | 1 | 2 | X | | | | | | | | | |
| J hooks (Actual) | 2 | 2 | 2 | 2 | 2 | 2 | 2 | 2 | 2 | 2 | 1 | 1 | 1 | 2 | 2 | X | | | | | | | | |
| Misc Metals (Patient Lift) | 1 | 1 | 1 | 1 | 1 | 1 | 1 | 1 | 1 | 2 | 1 | 1 | 1 | 1 | 2 | 2 | X | | | | | | | |
| Wall Bracing (for ceiling) | 1 | 1 | 1 | 1 | 1 | 1 | 1 | 1 | 1 | 2 | 1 | 1 | 1 | 2 | 2 | 1 | X | | | | | | | |
| King Studs for Doors | 1 | 1 | 1 | 1 | 1 | 1 | 1 | 1 | 1 | 2 | 1 | 1 | 1 | 2 | 2 | 1 | 1 | X | | | | | | |
| Struct Steel | 2 | 2 | 2 | 2 | 2 | 2 | 2 | 2 | 2 | 2 | 2 | 2 | 2 | 2 | 2 | 2 | 2 | 2 | X | | | | | |
| Seismic Bracing | 1 | 1 | 1 | 1 | 1 | 1 | 1 | 1 | 1 | 2 | 1 | 1 | 1 | 2 | 2 | 1 | 1 | 1 | 2 | X | | | | |
| Pneumatic tube | 1 | 1 | 1 | 1 | 1 | 1 | 1 | 1 | 1 | 2 | 1 | 1 | 1 | 2 | 2 | 1 | 1 | 1 | 2 | 1 | X | | | |
| Hangers | | | | | | 1 | 1 | 1 | 1 | 2 | 1 | 1 | 1 | 0 | 2 | 2 | 1 | 1 | 1 | 2 | 1 | 1 | X | |
| Access Zones | | | | | | 0 | 0 | 0 | 0 | 0 | 0 | 0 | 0 | 0 | 0 | 0 | 0 | 0 | 0 | 2 | 1 | 1 | 0 | X |

Required Clearance between Systems in Inches

FIG 1

| | Stage 1 | Stage 2 | Stage 3 | Stage 4 | AFTER FP (drops), Drywall framing around openings, & Seismic | SHOP DWGS ELECT (branch conduits) |
|---|---|---|---|---|---|---|
| PRIOR All drywall studs & misc steel | | | | | | |
| Stage 1 | Mechanical Ductwork (MD), Electrical (ELECT) (lighting & devices), & Fire Protection (FP) Fire Protection (FP) (sprinkler heads) | | | | | |
| Stage 2 | Pneumatic Tube (PT), Plumbing (PL) (graded lines) and Mechanical Piping (MP) (horizontal), ELECT (cable tray, major branch rack feeder conduits, and panels), & FP (mains & branches) | | | | | |
| Stage 3 | PL and MP (vertical) & ELECT (in wall) | | | | | |
| Stage 4 | Hanger/Halo Coordination | | | | | |
| ✪ | Signoff Deadline | | | | | |
| Criteria | Ensure coordination with structural, architectural elements, exterior skin, and all systems that have already been modeled | | | | | |

AUTOMATED MEP DESIGN

STATEMENT AS TO RIGHTS TO INVENTIONS MADE UNDER FEDERALLY SPONSORED RESEARCH AND DEVELOPMENT

Not Applicable

BACKGROUND OF THE INVENTION

A three dimensional model may be used to design a building before construction. Such a model may include various levels of detail, ranging from a simple rendering of the appearance of a building to a complex model including detailed descriptions of all components included in a construction project including wiring and pipes inside walls or Mechanical Electrical and Plumbing (MEP). A model of a building or construction projects may include various levels of detail for MEP information. A model may include a line-diagram for MEP providing information about the types of end-points, such as vent, electrical outlet and sink, and information about how they are connected, but without spatial information for the connections and without information about the types of wiring or ductwork connecting them. Conversely a more detailed model may include detailed three dimensional information about all aspects of an MEP system, including specific part numbers and a complete spatial model of all connecting wires, ducts, pipes and other components.

Designing a comprehensive model of an MEP system may be a time-consuming task, and require a great amount of manual work. Furthermore, when multiple people work on an MEP model, conflicts between different components of the system may arise and need to be resolved. The present invention provides a number of ways of automating the creation of a comprehensive model of an MEP system.

SUMMARY OF THE INVENTION

An embodiment of the invention includes a computer implemented method for generating mechanical electrical and plumbing plans and models for a building. The method may include receiving information about the building. This information may include a first structural model of the building. This first structural model may include structural components as well as architectural components of the building like walls, ceilings, MEP devices, outlet locations, inlet locations etc., the method may include receiving design specifications from a database. The design specifications may include information about local building codes, physical laws and building design rules. The method may also include retrieving information about available MEP components from a component library. Furthermore, the method may include analyzing the information about the building and the design specifications to determine additional elements for the first structural model of the building, and automatically preparing a second structural model of the building. The second structural model may include the additional elements. The information about these additional elements may include information about available MEP components.

In another embodiment, the second structural model may include a conflict between a first additional element and a second additional element. The method may then further include receiving rules about priority of components from a database and assigning a first priority to the first additional element, and a second priority to the second additional element. The first priority may be higher than the second priority, and then the second additional element may be modified to eliminate the conflict; a third structural model of the building comprising the modified second additional element may then be prepared.

In yet another embodiment of the invention the first structural model may include at least a first air outlet and a second air outlet; and the additional elements may include at least an air duct connecting the first air outlet and the second air outlet. The first structural model and/or the second structural model may be a three dimensional model. The second model may include information about the additional elements sufficient to manufacture the additional elements. The structural model may include information about walls in the building, including their location and thickness. It may furthermore include information about expected occupancy of rooms in the building; and information about the location of the building.

In an embodiment of the invention information about the local building codes may include information about fire regulations, electrical wiring requirements and about plumbing regulations. Furthermore, information about physical laws may include information relevant to determining the flow of water through a waste water pipe.

In an embodiment of the invention, analyzing the information about the building and the design specifications may include determining the required airflow for a number of air outlets connected to an air duct, and based on the total airflow for the air outlets, determining a cross-section area for the air duct.

An embodiment of the invention includes a non-transitory computer-readable storage medium including a number of computer-readable instructions on the computer-readable storage medium, which when executed by a data processor, provide automatically designed MEP for a building. The instructions may include instructions that cause the data processor to receive information about the building including a first structural model of the building. The instructions may further include instructions that cause the data processor to retrieve design specifications from a database. Design specifications may include information about local building codes, physical laws and building design rules. Furthermore, the instructions may include instructions that cause the data processor to retrieve information about available MEP components from a component library and instructions that cause the data processor to analyze the information about the building and the design specifications to determine additional elements for the first structural model of the building, and automatically prepare a second structural model of the building comprising the additional elements. The information about available MEP components may include information about at least one of the additional elements.

An embodiment of the invention may include a system for automatically designing MEP for a building. The system may include a processor; and further include a memory disposed in communication with the processor such that the memory stores processor executable instructions. The instructions may include instructions for receiving information about the building comprising a first structural model of the building; and further retrieving design specifications, including information about local building codes, physical laws and building design rules from a database. Furthermore, the instructions may include instructions for retrieving information about available MEP components from a component library; and instructions for analyzing the information about the building and the design specifications to determine additional elements for the first structural model of the building, and automatically preparing a second structural model of the building comprising the additional elements, such that the information about available MEP components includes information about at least one of the additional elements

DETAILED DESCRIPTION OF THE INVENTION

Embodiments of the present invention provide methods for creating and improving models for construction containing mechanical electrical and plumbing (MEP) information.

An embodiment of the invention includes a computer implemented method for generating MEP plans for a building. The method may begin by receiving information about the building. This information may include a model of the building. The model may be a three dimensional model. In another embodiment of the invention, the information may include one two dimensional models of one or more floors of a building. Any type of model may include some form of MEP information.

The MEP information may include information about the building. Such MEP information may include basic information about endpoints for MEP functions. Such endpoints may include electrical outlets, air outlets, air inlets, light switches, light points, faucets and refuse water points, locations for toilets and any other MEP endpoint. In an embodiment of the invention The MEP endpoints may also include specialized features, such as oxygen outlets for use in a hospital or a high-voltage outlet for specialized appliances. In one embodiment of the invention, the information about the endpoints includes only the location of the endpoint and the type of the endpoint. The location may be a precise position on a wall in a room, or a less accurate location such as a room, a wall, or a range based on a point. In another embodiment of the invention more information is available about each endpoint. For example, a particular part number for the end-point interface may be provided. If the endpoint is an electrical socket, it may be specified that the electrical socket is a four-outlet electrical socket with a particular part number and a particular faceplate. If the endpoint is an air outlet, the exact dimensions may be specified as well as a precise part number for the vent. Including the precise part number may among other information provide information about the dimensions and orientation of the connecting interface.

Endpoints may also include units such as HVAC inlets, heat-pumps and other components. Similarly, the endpoints may include a main building water-supply or electricity supply, or an electrical or water interchange for a floor or part of a building. Endpoints may also include intermediate points, such as a fuse box, a water meter or other items.

Figure 9:
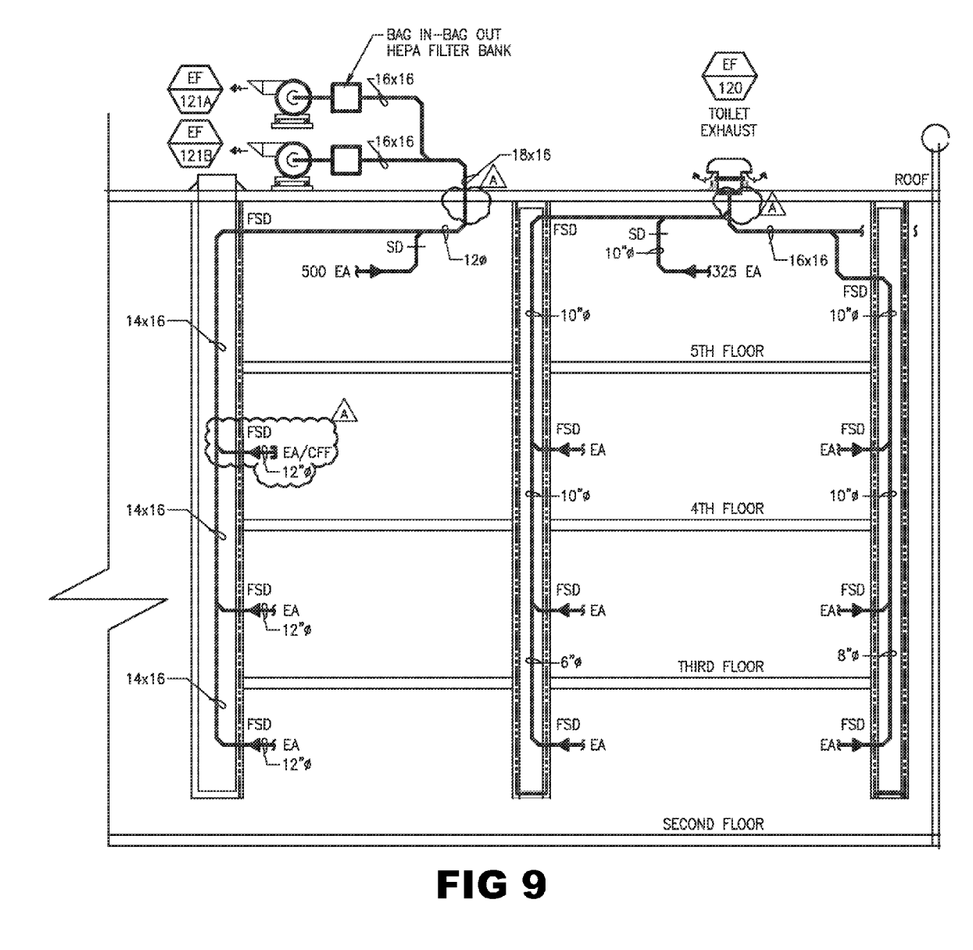
FIG. 9 shows a line-chart for a portion of an MEP system.

In other embodiments of the invention the MEP information may include information about more than the endpoints. This information may include information about how the endpoints are connected. This may include a complete chart of how all the endpoints are connected or incomplete connection information for some of the endpoints. For example, information about main water supply lines in a building may be included, but information about how each water faucet or other water consuming endpoint is connected to the main water supply lines may be lacking The information about how the endpoints are connected may in one embodiment of the invention only include a line-chart. The line chart may provide information about what endpoints are connected to, but may provide no or lacking information about the connections. For example, a line chart may show that an air outlet is connected to a duct that goes to an air interchange for the $6^{th}$ floor, and that that interchange is connected to a main air inlet. However, the line chart may completely lack information about the spatial routing of the duct represented by the line, and may include no information about the type of duct represented by the line. An example of a line-chart is shown in FIG. 9.

Furthermore, the method may include receiving design specifications from a database. The design specifications may include information about local building codes, physical laws and building design rules. The database may be local on the computer executing the method, or may be a remote or distributed database. For example, multiple databases may be queried for different types of regulations. For example, a local database may contain information about physical laws. A centralized database for a company may contain information about a construction project, and two remote databases may be used for local and national regulations. For example, the design specifications may include information about a required airflow based on the area or the volume of a room—for example, as per ASHRAE an airflow of 0.12 cubic feet per minute is required per square foot for classroom space. Furthermore, the design specification may include information for determining the required diameter of an air duct given the required air-flow. For refuse water pipes, the design specifications may include physical as well as legal requirements of a gradient for the pipe. For electrical wiring the design specifications may similarly include both physical and legal requirements for the cross section and insulation of wiring as well as other rules for routing wiring in a building. In sum, the database of design specifications may include any information useful to determining what MEP components to use and how to design an MEP system, whether legal, practical, physical or otherwise. In particular, the database may include local-code specific information. This may be particularly useful if parts of a building model is reused in a different location or after local codes have been changed.

The method may also include retrieving information about available MEP components from a component library. A component library may include a library of information about generic components, such as a standard electrical outlet, and various ducts and outlets in various sizes. In other embodiments of the invention, a component library may include a library of information about particular components produced by one or more manufacturers. For example, if HVAC components from Manufacturer A is used in the construction project, a library of Manufacturer A's HVAC components may be loaded into the database along with plumbing components from Manufacturer B.

The information about the components may include basic information such as the type of component and its size as well as more detailed information relating to its use. For example for an air outlet this may include information about its maximum air flow; for an electrical outlet it may include information about the maximum load and the number of outlets. Furthermore, the information may include a three dimensional model of the component that can be used with computer aided drawing (CAD) applications. The three dimensional model may be very accurate and for certain customizable components may include parameters enabling modification of the component. For example for a flexible duct, the model may include information about its tensile strength and hoe it can be moved and stretched and how its flow properties may be affected by its physical configuration.

Using the first model including the MEP information and the database of components, additional MEP components may be determined. In an embodiment of the invention, the first model is analyzed to determine what MEP components to add. For example an air outlet without a connection to a duct may be detected.

In an embodiment of the invention where information about space allocated for MEP is included in the first model, an algorithm may be used to determine an optimal path between two MEP endpoints. In one embodiment of the invention Dijkstra's algorithm may be used. Space allocated for MEP may be divided into vertices and endpoints, and Dijkstra's algorithm may be used to determine an optimal path through the space that connects the two points. When multiple endpoints are to be connected, such as multiple air outlets connected to a single duct wherein that duct is connected to an air inlet or an HVAC unit, different orderings may be attempted and Dijkstra's algorithm may be applied to find an optimal path between each two endpoints. The ordering that produces the most optimal aggregate path may then be selected. In a different embodiment, Dijkstra's algorithm may be applied to the vertices and edges comprised by the space allocated for MEP with the MEP endpoints added as additional vertices. The optimal Dijkstra algorithm that hits all the MEP endpoints may then be selected. Other path finding algorithms may also be used, such as the A* algorithm. Persons skilled in the art will appreciate that a number of path finding algorithms may be used and applied in a number of ways to approach this problem.

When applying a pathfinder algorithm, the available space for MEP, whether designated in the first model or not must be converted in to a graph comprising vertices and edges. This may be done as described above or in a number of other ways. For example, if no space is dedicated for MEP in the model, in one embodiment of the invention, rules from a database may be used to determine space for MEP based on information in the first model. For example, space in the walls of the building may be analyzed to determine open polygons of space. Various shapes may be used, but the space may be divided into cuboid spaces, wherein each cuboid space is considered an edge, and meeting points between the various cuboids are considered vertices of the graph. A person skilled in the art will appreciate that the space can be divided in a number of ways. Where MEP space is allocated, the same process may be applied, but wherein the polygons are limited to being in the space allocated for MEP. In a different embodiment, the entire space may be allocated into polygons, and the polygons may be weighted as edges in the graph based on their overlap with the space allocated for MEP, such that paths that go through the space allocated for MEP will be preferred over spaces that do not go through that space. This may allow for application on the invention on models where the space allocated for MEP is not continuous and it is therefore not possible to connect endpoints by exclusively using the space allocated for MEP.

If the first model includes line information indicating what other endpoints each MEP endpoint is connected to, this information may be used as the basis for applying the pathfinder algorithm. Conversely if there is no such line chart, or the line chart is incomplete, a line chart muse be generated based on the information present in the model. A database of rules for generating such a line chart may be used in this process. For example, the database or the model may include information about what type of supply each endpoint provides or requires. For example air supply for HVAC or cold water supply. The endpoints with a particular required supply may be identified; similarly, the endpoints that provide the corresponding supply may be identified. In one embodiment of the invention, the most proximate supply endpoint for each consuming endpoint may be identified and assigned together. The pathfinder algorithm may then be applied to each group to determine the most optimal path to connect the consuming endpoints to the supply endpoint. Once an optimal routing is found for each, the distribution may be further optimized by incrementally moving a consuming endpoint from one group to another to determine whether the routing is improved by the reassignment. In another embodiment of the invention, various clustering algorithms may be used to determine the optimal assignment of consuming endpoints to a supplying endpoint. In yet another embodiment, rules may be applied to alter any algorithm to give preference to certain particular grouping, such as grouping endpoints on a particular floor together, or for grouping endpoints in a particular fire-segregation zone together.

In yet another embodiment of the invention, the first model may be used to generate a maze for routing MEP rather than a graph. Maze solving algorithms may then be used to optimally route MEP connections through this maze. Persons skilled in the art will appreciate that a number of different maze solving algorithms may be used and that many of the same principles discussed in relation to using a graph-based model may be applied in this scenario.

When generating a maze from the information about the first building polygons fitting inside space allocated for or available for MEP may be used as the basis for forming a three-dimensional maze. In an embodiment of the invention, the three dimensional maze may be collapsed to a two-dimensional maze with weighting applied to easier apply existing algorithms.

Other approximation than graphs and mazes may be used and a person skilled in the art will appreciate that the present invention is not limited to the examples recited above.

Once an optimal solution for MEP for one type of component is determined, the same procedure may be used for another type of MEP component. For example, the algorithm may first be applied for refuse water because the pipes needed are large and require a particular gradient. The algorithm may then be applied for HVAC air supply.

Figure 5:
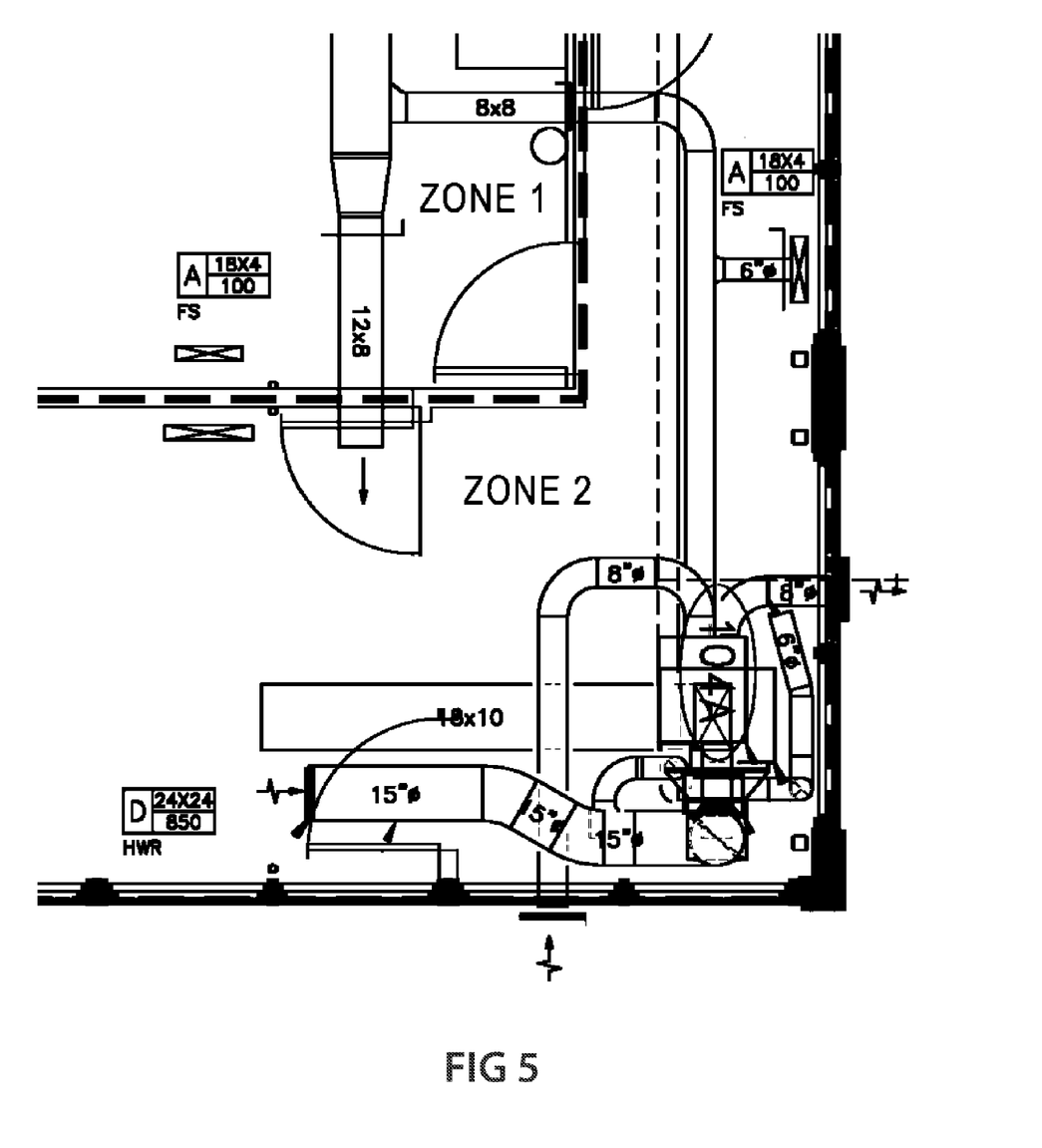
FIG. 5 shows a portion of an MEP system.

FIG. 5 shows a portion of an MEP system, which as described further herein may be used as information that is processed by an MEP design system and/or output as second and/or third structural model(s).

The method may include analyzing the information about the building and the design specifications to determine additional elements for the first structural model of the building, and automatically preparing a second structural model of the building. The second structural model may include the additional elements. The information about these additional elements may include information about available MEP components. The additional elements may be a part of the path determined to connect two MEP components. These components may be selected from the database of components. In order to match the components to the determined path, properties of the available MEP components may be matched with the determined properties of the path between two MEP endpoints. In another embodiment of the invention, the determined properties of the determined path may be used as a basis for querying a library or database of components.

In one embodiment of the invention, after the application of the algorithm to one type of endpoints, elements for those endpoints may be added to the first model of the building. The new model with the additional elements may then be used as the basis for the application of the algorithm to the next group of endpoints. For example, if the algorithm is first applied for refuse water, the determined refuse water pipes may be added to the first model to create an intermediate model. When using the algorithm to determine HVAC air supply ductwork this intermediate model may then be used to avoid any conflicts between the HVAC ductwork and the refuse water pipes. The additional elements may mean that a different graph or maze is generated as the polygons generated to represent available space may avoid the space occupied by the refuse water pipes.

In a different embodiment of the invention, each group of endpoints is processed using the first model of the building. This may in turn result in conflicts between various types of MEP systems. For example, a refuse water pipe may have been designed to go through an air supply duct. In this case, an algorithm may be used to detect conflicts and resolve them according to particular rules. For example, the rules may include a prioritized order for various MEP components. In one embodiment of the invention, refuse water pipes are prioritized over HVAC ducts. When a conflict between the two is detected, the refuse water pipe, having the higher priority may be left in its current path, whereas the HVAC duct is rerouted to avoid the refuse water pipe. Rerouting may be done in a number of ways, and in particular the algorithms used to find the path in the first place, such as the algorithms described above, may be used to find a new route for the rerouted component.

The rules about priority of components may be received from a database. For example, a first priority to the first additional element, and a second priority to the second additional element. The first priority may be higher than the second priority, and then the second additional element may be modified to eliminate the conflict; a third structural model of the building comprising the modified second additional element may then be prepared.

Figure 1:
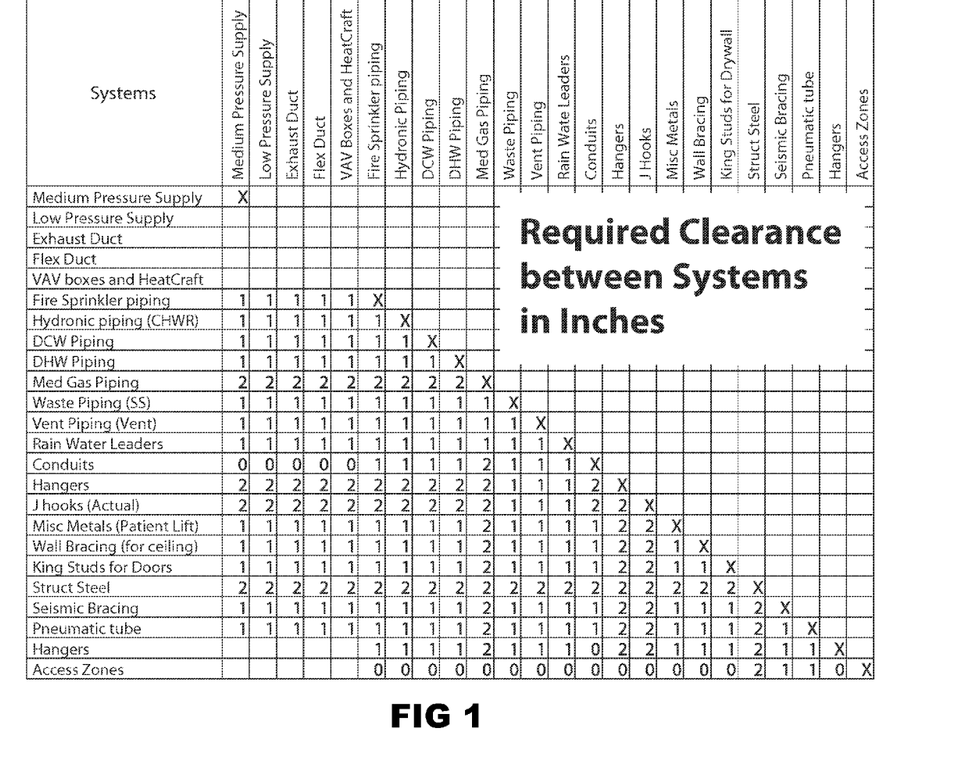
FIG. 1 shows a chart indicating prioritization of various MEP components.
Figure 2:
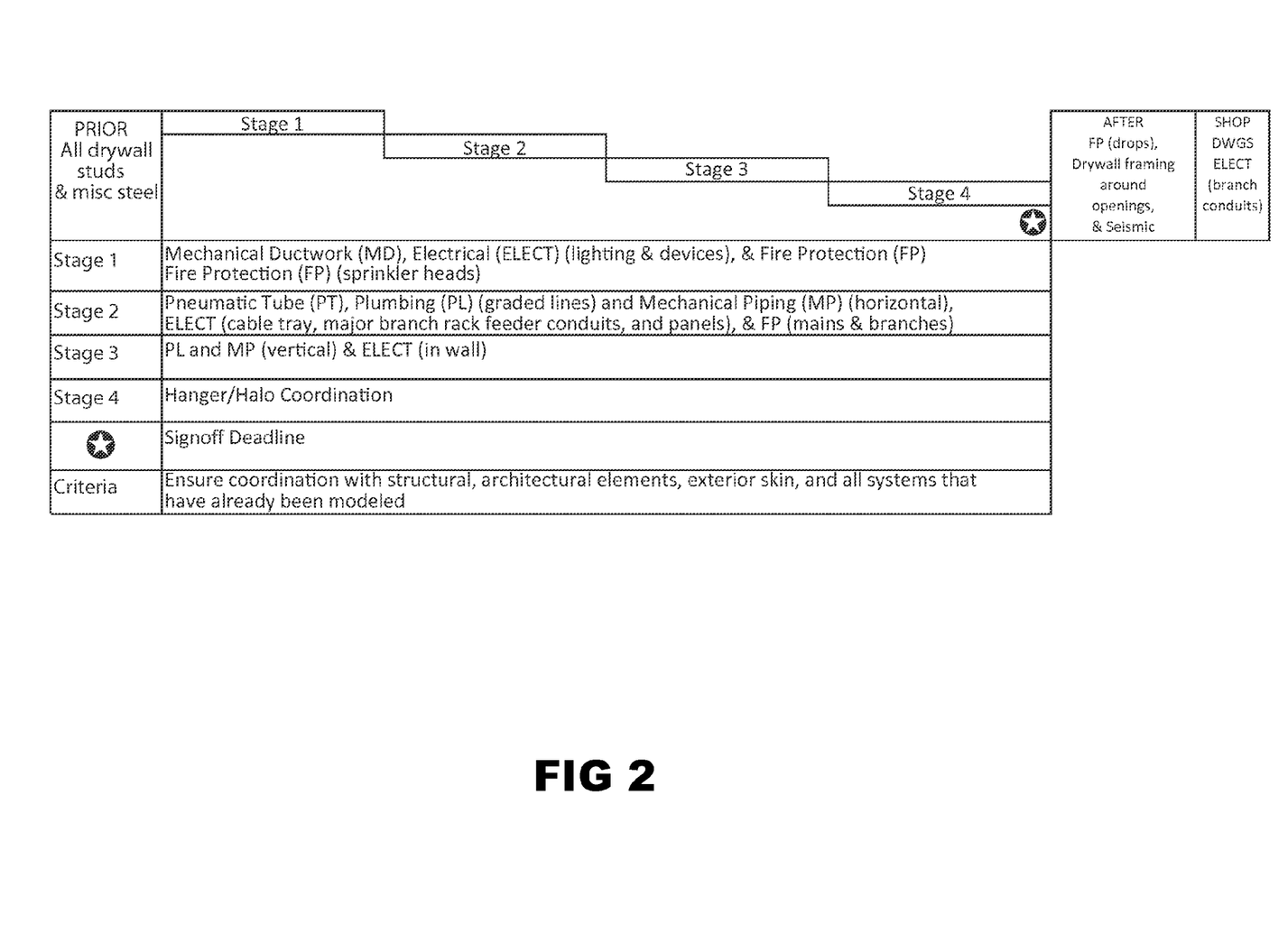
FIG. 2 shows a chart indicating prioritization of various MEP components.
Figure 3:
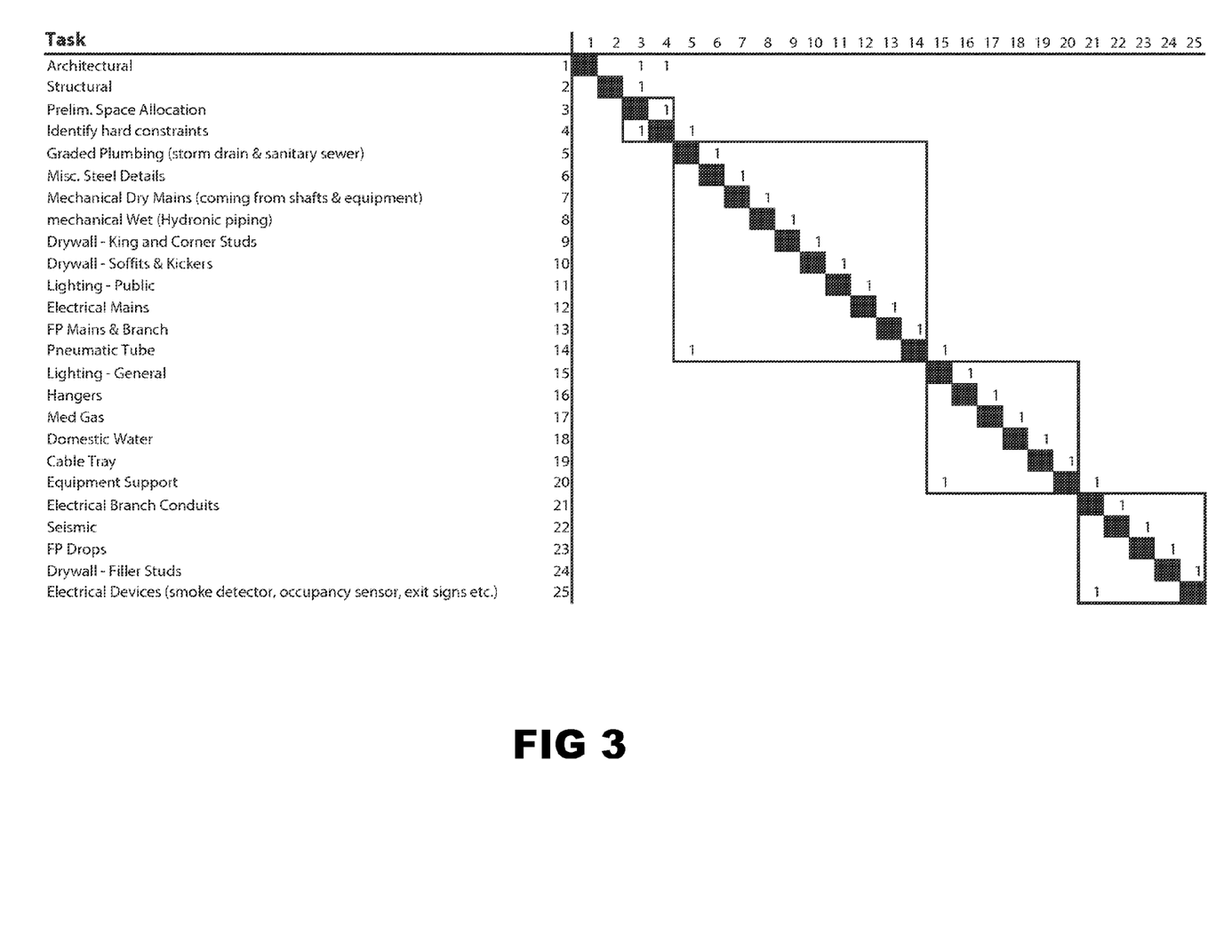
FIG. 3 shows a chart indicating prioritization of various MEP components.
Figure 4:
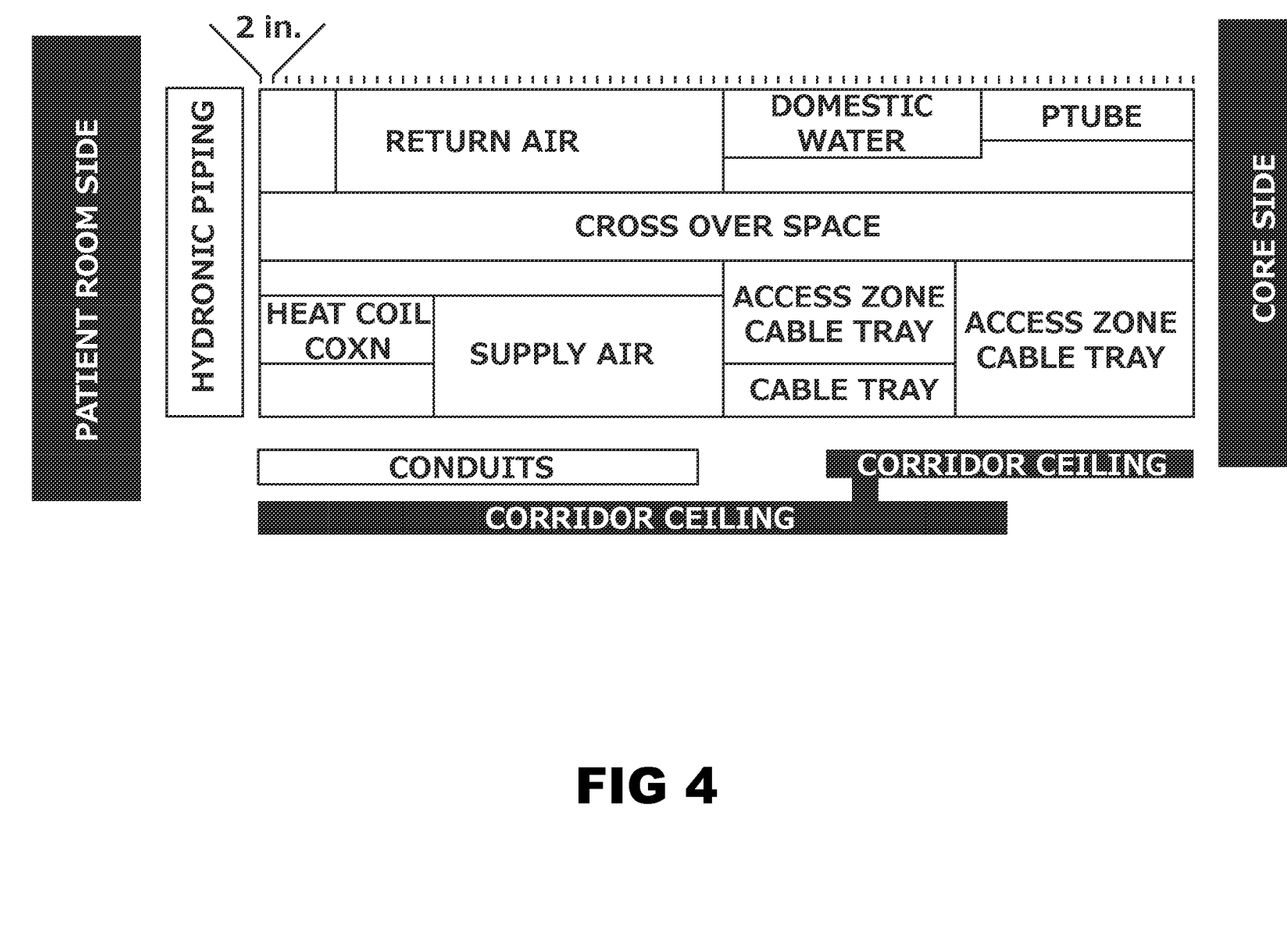
FIG. 4 shows a portion on an MEP system.

The priority rules may be a strict ordering, such as the one shown in FIGS. 1-3. For example, FIG. 3 shows a chart indicating prioritization of various MEP components, ranging from "Architectural" (priority 1) to "Electrical Devices" (priority 25), such that priority levels may be obtained and assigned to specific components. The rules may also be more dynamic and relate to local building rules and other parameters. For example priority rules may also favor rerouting the component that can be rerouted the most easily. While it may generally be easier to reroute an HVAC duct than a refuse water pipe due to the required gradient, in certain circumstances, this may not be true if the HVAC duct is large and there is a lack of space; the priority rules may account for this and in those circumstances favor the HVAC duct.

In yet another embodiment of the invention the first structural model may include at least a first air outlet and a second air outlet; and the additional elements may include at least an air duct connecting the first air outlet and the second air outlet. The first structural model and/or the second structural model may be a three dimensional model. The second model may include information about the additional elements sufficient to manufacture the additional elements. The structural model may include information about walls in the building, including their location and thickness. It may furthermore include information about expected occupancy of rooms in the building; and information about the location of the building.

In an embodiment of the invention, analyzing the information about the building and the design specifications may include determining the required airflow for a number of air outlets connected to an air duct, and based on the total airflow for the air outlets, determining a cross-section area for the air duct.

Where information about expected occupancy is included in the model this may be used to determine certain requirements for both MEP endpoints and the connections between them. For example, if a model indicates that a room may hold 25 people, it may be determined based on ASHRAE that an airflow of 375 CFM is required. It may further be determined that a particular size HVAC endpoint must be used to meet this requirement and that particular size ducts must be used to feed these endpoints.

In an embodiment of the invention information about the local building codes may include information about fire regulations, electrical wiring requirements and about plumbing regulations. Furthermore, information about physical laws may include information relevant to determining the flow of water through a waste water pipe.

An embodiment of the invention includes a non-transitory computer-readable storage medium comprising a number of computer-readable instructions on the computer-readable storage medium, which when executed by a data processor, provide automatically designed MEP for a building. The instructions may include instructions that cause the data processor to receive information about the building including a first structural model of the building. The instructions may further include instructions that cause the data processor to retrieve design specifications from a database. Design specifications may include information about local building codes, physical laws and building design rules. Furthermore, the instructions may include instructions that cause the data processor to retrieve information about available MEP components from a component library and instructions that cause the data processor to analyze the information about the building and the design specifications to determine additional elements for the first structural model of the building, and automatically prepare a second structural model of the building comprising the additional elements. The information about available MEP components may include information about at least one of the additional elements such that the elements can be ordered from a supplier or be manufactured to a particular specifications.

An embodiment of the invention may include a system for automatically designing MEP for a building. The system may include a processor; and further include a memory disposed in communication with the processor such that the memory stores processor executable instructions. The computer may be a personal desktop computer, a laptop computer, a smartphone, a tablet or any other type of device. In some embodiments of the invention, the computer is a server of a mainframe computer. The server or mainframe may communicate with a terminal computer over a network. The instructions may include instructions for receiving information about the building comprising a first structural model of the building; and further retrieving design specifications, including information about local building codes, physical laws and building design rules from a database. Furthermore, the instructions may include instructions for retrieving information about available MEP components from a component library; and instructions for analyzing the information about the building and the design specifications to determine additional elements for the first structural model of the building, and automatically preparing a second structural model of the building comprising the additional elements, such that the information about available MEP components includes information about at least one of the additional elements.

Figure 6:
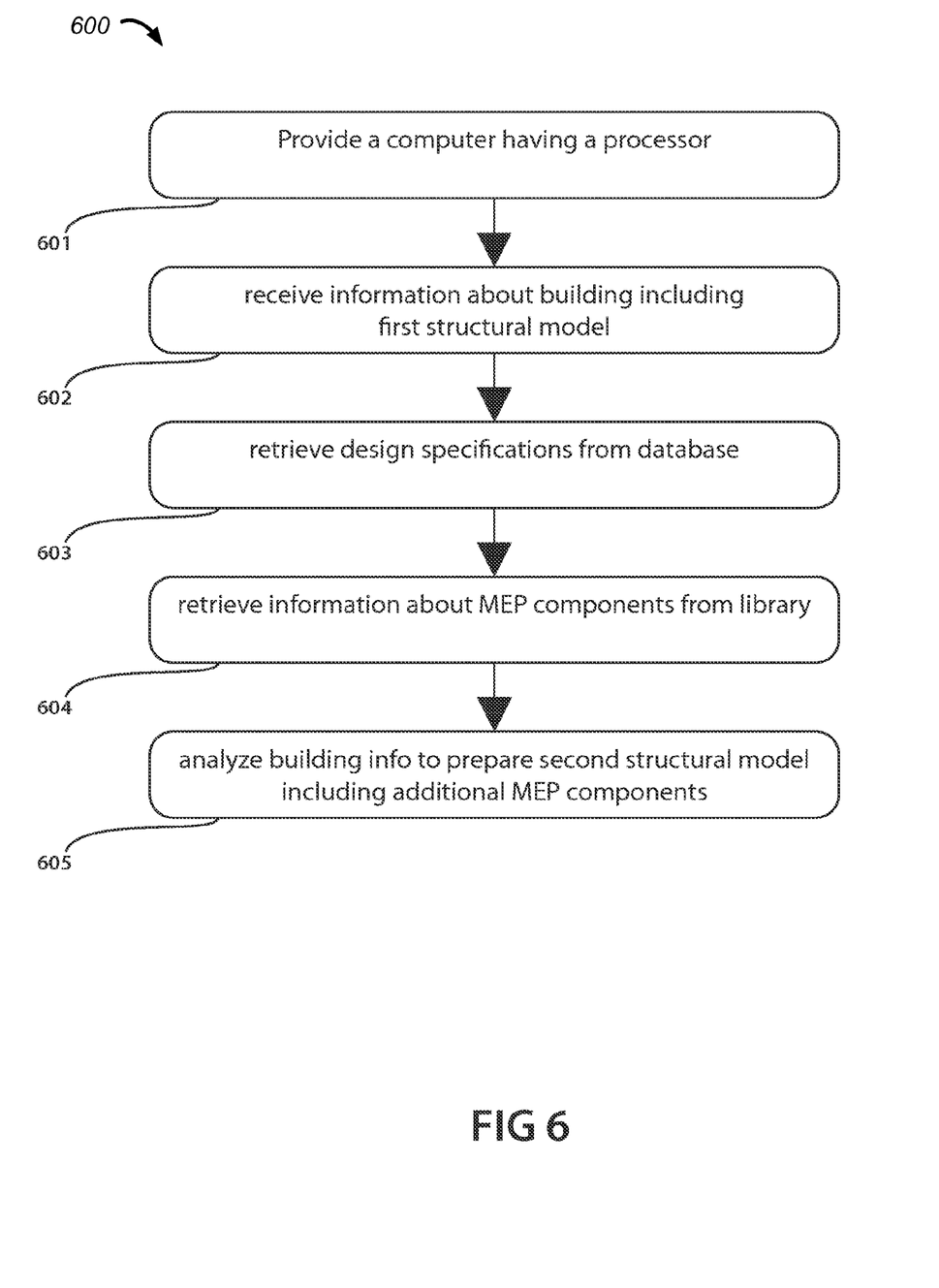
FIG. 6 is a high-level flowchart illustrating a method for automatically designing MEP for a building according to an embodiment of the present invention.

FIG. 6 is a simplified flowchart illustrating a method for automatically designing MEP for a building according to an embodiment of the present invention. The method 600 includes providing a computer having a processor (601) and receiving information about a building including a first structural model (602). In an embodiment of the invention, the information is received over a network connection. Furthermore, the method includes retrieving design specifications from a database (603). Furthermore, the method includes receiving design specification from a database. The method further includes retrieving information about MEP components from a library (604). The method may then include analyzing the building information to prepare a second structural model including additional MEP components (605).

It should be appreciated that the specific steps illustrated in FIG. 6 provide a particular method for automatically designing MEP for a building. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
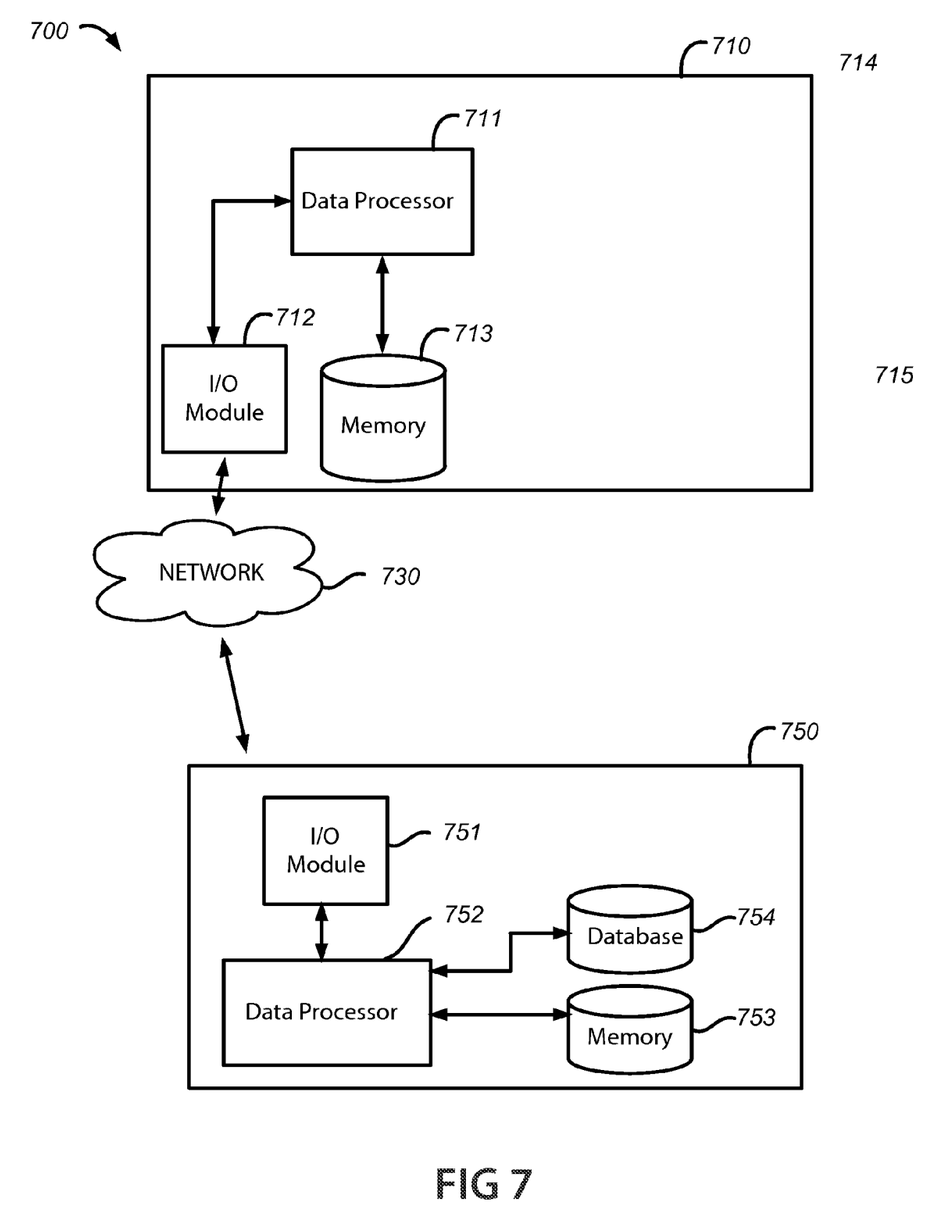
FIG. 7 is a high-level schematic diagram illustrating a system for automatically designing MEP for a building according to an embodiment of the present invention.

FIG. 7 is a simplified schematic diagram of a system for automatically designing MEP for a building according to an embodiment of the present invention. As illustrated in FIG. 7 computer 710 can include one of many types of computing devices including, without limitation, a personal computer, a laptop computer, a notebook computer, a tablet computer, a handheld mobile device, a PDA, a mobile phone, or the like. The computer 710 includes a data processor 711, and a memory 713. The computer also includes an I/O module that may be used to communicate with a computer (750) including a database. There may be one or more such computers with databases.

Figure 8:
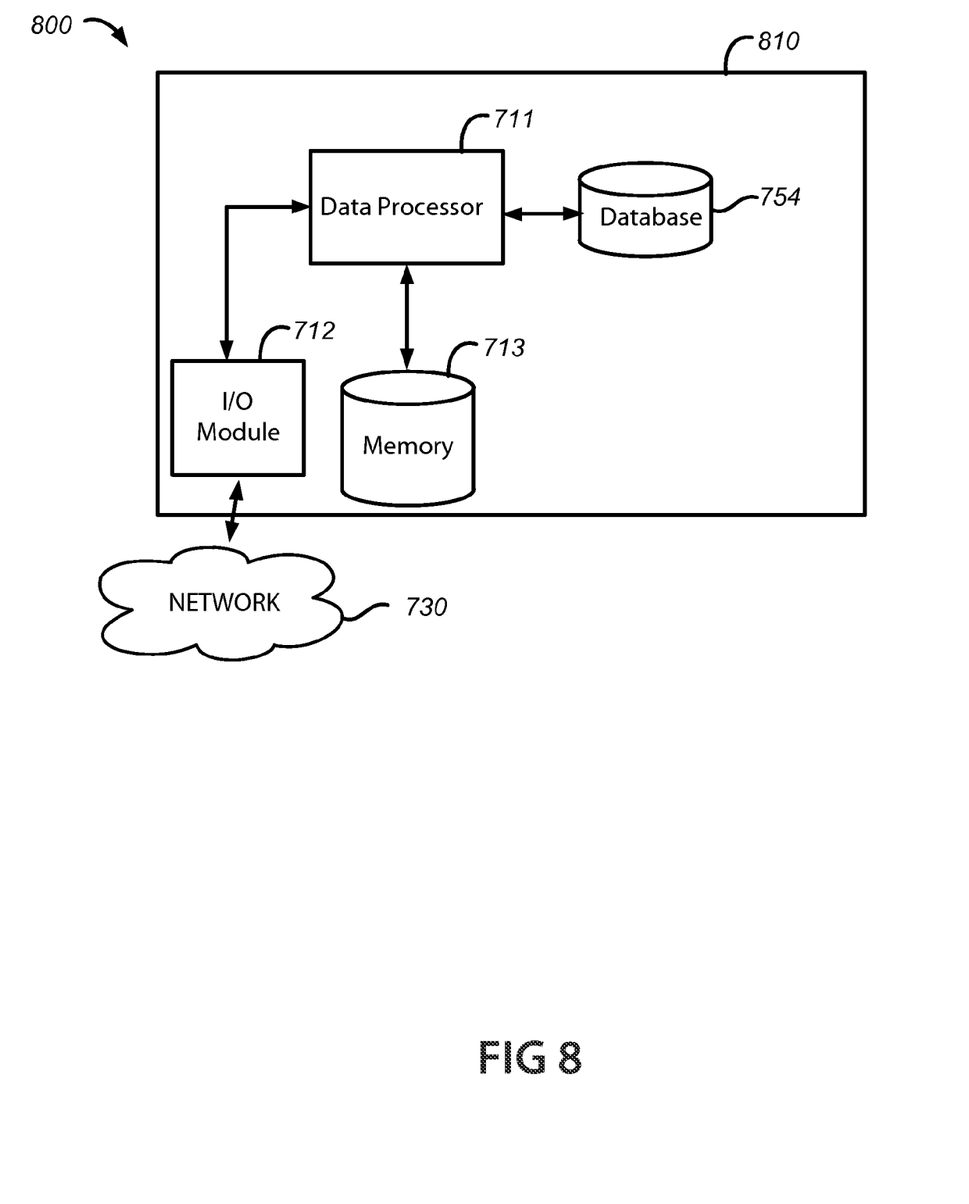
FIG. 8 is a high-level schematic diagram illustrating a system for automatically designing MEP for a building according to an embodiment of the present invention.

FIG. 8 is a simplified schematic diagram of a system for automatically designing MEP for a building according to an embodiment of the present invention. FIG. 8 shows a computer 810 including a database 754. As the computer 710 in FIG. 7, it includes a data processor 711, and a memory 713. However, since it includes a database it does not need to rely on a second computer that information. In another embodiment of the invention one or more databases may be local and one or more databases may be remote and a networking interface may be used to communicate with the remote databases as shown in FIG. 7.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method for automatically designing MEP for a building comprising:
   providing a processor;
   receiving information about the building comprising a first structural model of the building;
   retrieving from a database, design specifications, including information about local building codes, physical laws and building design rules;
   retrieving from a component library, information about available MEP components;
   analyzing, using the processor, the information about the building and the design specifications to determine additional elements for the first structural model of the building; and
   automatically preparing a second structural model of the building comprising the additional elements, wherein the information about available MEP components comprises information about at least one of the additional elements.

2. The method of claim 1 wherein the second structural model includes a conflict between a first additional element and a second additional element, the method further comprising:
   receiving rules about priority of components from a database and assigning a first priority to the first additional element, and a second priority to the second additional element, wherein the first priority is higher than the second priority;
   modifying the second additional element to eliminate the conflict; and
   preparing a third structural model of the building comprising the modified second additional element.

3. The method of claim 1 wherein the first structural model includes at least a first air outlet and a second air outlet, and wherein the additional elements include at least an air duct connecting the first air outlet and the second air outlet.

4. The method of claim 1 wherein the first structural model comprises a three dimensional model, and wherein the second structural model comprises a three dimensional model.

5. The method of claim 1 wherein the second structural model comprises information about the additional elements sufficient to manufacture the additional elements.

6. The method of claim 1 wherein the structural model of the building comprises
- information about walls in the building, including their location and thickness;
- information about expected occupancy of rooms in the building; and
- information about a location of the building.

7. The method of claim 1 wherein the information about the local building codes comprises information about fire regulations, information about electrical wiring requirements and information about plumbing regulations.

8. The method of claim 1 wherein the information about physical laws comprises information relevant to determining the flow of water through a waste water pipe.

9. The method of claim 1 wherein analyzing the information about the building and the design specifications comprises determining a required airflow for a plurality of air outlets connected to an air duct, and based on a total airflow for the plurality of air outlets, determining a cross-section area for the air duct.

10. A non-transitory computer-readable storage medium comprising a plurality of computer-readable instructions tangibly embodied on the computer-readable storage medium, which when executed by a data processor, provide automatically designed MEP for a building, the plurality of instructions comprising:
- instructions that cause the data processor to receive information about the building comprising a first structural model of the building;
- instructions that cause the data processor to retrieve from a database, design specifications, including information about local building codes, physical laws and building design rules;
- instructions that cause the data processor to retrieve from a component library, information about available MEP components;
- instructions that cause the data processor to analyze the information about the building and the design specifications to determine additional elements for the first structural model of the building; and
- instructions that cause the processor to automatically prepare a second structural model of the building comprising the additional elements, wherein the information about available MEP components comprises information about at least one of the additional elements.

11. The non-transitory computer-readable storage medium of claim 10 wherein the second structural model includes a conflict between a first additional element and a second additional element, and further comprising:
- instructions that cause the data processor to receive rules about priority of components from a database and assign a first priority to the first additional element, and a second priority to the second additional element, wherein the first priority is higher than the second priority;
- instructions that cause the data processor to modify the second additional element to eliminate the conflict; and
- instructions that cause the data processor to prepare a third structural model of the building comprising the modified second additional element.

12. The non-transitory computer-readable storage medium of claim 10 wherein the first structural model includes at least a first air outlet and a second air outlet, and wherein the additional elements include at least an air duct connecting the first air outlet and the second air outlet.

13. The non-transitory computer-readable storage medium of claim 10 wherein the first structural model comprises a three dimensional model, and wherein the second structural model comprises a three dimensional model.

14. The non-transitory computer-readable storage medium of claim 10 wherein the second structural model comprises information about the additional elements sufficient to manufacture the additional elements.

15. The non-transitory computer-readable storage medium of claim 10 wherein the structural model of the building comprises
- information about walls in the building, including their location and thickness;
- information about expected occupancy of rooms in the building; and
- information about a location of the building.

16. A system for automatically designing MEP for a building, comprising:
- a processor; and
- a memory disposed in communication with the processor and storing processor executable instructions, the instructions comprising instructions for:
  - receiving information about the building comprising a first structural model of the building;
  - retrieving from a database, design specifications, including information about local building codes, physical laws and building design rules;
  - retrieving from a component library, information about available MEP components;
  - analyzing the information about the building and the design specifications to determine additional elements for the first structural model of the building; and
  - automatically preparing a second structural model of the building comprising the additional elements, wherein the information about available MEP components comprises information about at least one of the additional elements.

17. The system of claim 16 wherein the second structural model includes a conflict between a first additional element and a second additional element, and wherein the instructions further comprise:
- instructions for receiving rules about priority of components from a database and assigning a first priority to the first additional element, and a second priority to the second additional element, wherein the first priority is higher than the second priority;
- instructions for modifying the second additional element to eliminate the conflict; and
- instructions for preparing a third structural model of the building comprising the modified second additional element.

18. The system of claim 16 wherein the first structural model includes at least a first air outlet and a second air outlet, and wherein the additional elements include at least an air duct connecting the first air outlet and the second air outlet.

19. The system of claim 16 wherein the first structural model comprises a three dimensional model, and wherein the second structural model comprises a three dimensional model.

20. The system of claim 16 wherein the second structural model comprises information about the additional elements sufficient to manufacture the additional elements.

* * * * *